(12) United States Patent
Langhi et al.

(10) Patent No.: US 9,676,547 B2
(45) Date of Patent: Jun. 13, 2017

(54) COFFEE CAPSULE

(71) Applicant: Alice Allison SA, Grono (CH)

(72) Inventors: Leonardo Langhi, Romagnano Sesia (IT); Carlo Morfini, Mendrisio (CH)

(73) Assignee: ALICE ALLISON SA, Grono (CH)

( * ) Notice: Subject to any disclaimer, the term of this patent is extended or adjusted under 35 U.S.C. 154(b) by 77 days.

(21) Appl. No.: 14/880,509

(22) Filed: Oct. 12, 2015

(65) Prior Publication Data

US 2016/0101928 A1    Apr. 14, 2016

(30) Foreign Application Priority Data

Oct. 13, 2014    (CH) ........................................ 1559/14

(51) Int. Cl.
    *B65D 85/804*    (2006.01)
(52) U.S. Cl.
    CPC ................... *B65D 85/8043* (2013.01)
(58) Field of Classification Search
    CPC ................................................. B65D 85/8043
    See application file for complete search history.

(56) References Cited

U.S. PATENT DOCUMENTS

| 8,402,883 B2 | 3/2013 | Kollep et al. | |
|---|---|---|---|
| 2005/0150390 A1* | 7/2005 | Schifferle | B65D 85/8043 99/295 |
| 2010/0180775 A1 | 7/2010 | Kollep et al. | |
| 2014/0087028 A1 | 3/2014 | Orsi | |

FOREIGN PATENT DOCUMENTS

| EP | 2210827 | 7/2010 |
|---|---|---|
| EP | 2712824 | 4/2014 |
| FR | 2617389 | 1/1989 |

* cited by examiner

*Primary Examiner* — Erik Kashnikow
*Assistant Examiner* — Chaim Smith
(74) *Attorney, Agent, or Firm* — Paul D. Bianco; Fleit Gibbons Gutman Bongini & Bianco PL

(57) ABSTRACT

A capsule which under pressure in expresso machines is suitable for extraction of coffee, including a truncated cone-shaped capsule body of thermoformed plastic having a conical side wall, the wider end of the side wall defining an outlet side of the capsule and the narrower end of the side wall defining an inlet side of the capsule. A destructible inlet sealing membrane closes the inlet opening of the capsule body and is attached to the inside of the capsule body. The capsule body further includes a circumferential centering ramp at the narrower end of the conical side wall, which translates into an inwardly directed circumferential second flange forming the circular inlet opening, the circumferential centering ramp designed to align the inlet sealing membrane with the inlet opening before welding it to the second flange. The inlet sealing membrane has a diameter larger than the outer diameter of the second flange to be bend upwards along the centering ramp and to at least partially cover the centering ramp when welding it to the second flange. The upwards bend edge forms a heat protecting layer between a hot sealing tool and the centering ramp during welding.

16 Claims, 1 Drawing Sheet

COFFEE CAPSULE

TECHNICAL FIELD

The invention relates to capsule which under pressure in expresso machines is suitable for extraction of coffee and which may contain roasted and ground coffee.

The capsule comprises a truncated cone-shaped capsule body of thermoformed plastic having a side wall. The wider end of the side wall defines an outlet side of the capsule and the narrower end of the side wall defines an inlet side of the capsule. The capsule body further has an outwardly directed circumferential first flange on the wider end of the side wall providing a sealing area towards a brewing chamber of an expresso machine; and a circular inlet opening on the narrower end of the conical side wall. A destructible outlet sealing membrane is attached to the first flange and closes the outlet side of the capsule body. A inlet sealing membrane closes the inlet opening of the capsule body and is attached to the inside of the capsule body.

PRIOR ART

For more than 20 years, the company Nestlé SA has been successfully selling portioned packages containing roasted and ground coffee, with which coffee can be extracted under pressure in espresso machines. These portioned packages are known in several shapes; it is however the conical capsules which have proven particularly successful on the market. The expresso machines for these conical capsules comprise a so-called brewing chamber largely corresponding to the shape of the capsules. The capsules are held in the machine in a clamped and sealed manner, whereupon several water injection needles or tear-open tips penetrate into the capsule at its narrower end. When water as an extraction fluid is getting into the capsule under pressure, a sealing membrane on the wider end of the capsule is destroyed in a patterned manner at several locations by a counter-pressure plate in the machine and the extraction fluid can thus practically exit through a sieve leaving the ground coffee within the capsule.

Various patents directed to these capsules have expired in the meantime, and capsules in competition have arrived on the market. These are designed such that they can be used compatibly with the already existing expresso machines.

The compatible capsules which are present on the market today are of plastic for ecological as well as economic reasons instead of the original aluminium capsules. This means that the capsules must be designed such that injection needles belonging to the machine do not come into contact with the plastic of the capsule, because otherwise the hot injection needles or tear-open tips would cause melting of the plastic material, which would lead to a bonding of the injection needles and thus would result in the exit openings of these needles becoming blocked. Such a plastic capsule is described e.g. in EP2712824.

Also, the tips heated by the hot water would soften the plastic and this plastic would form around the tip in a closing manner and handicap the correct entry of water. The plastic residues remaining on the tips moreover lead to a blunting of the tips and these would no longer function correctly over time. Accordingly, these capsules are built smaller in axial direction as the original capsules of the company Nestlé SA and/or have a recessed bottom part. Thereby significantly more water gets into the brewing chamber of the machine and may flow around the capsule on extraction. Only when the remaining space between the capsule and the brewing chamber is completely filled, does the water forcibly go only into the plastic capsule. However, this is not the case and a need of a greater sealing effect between the brewing chamber of the machine and the inserted plastic capsule exists.

Disadvantageous to the shorter plastic capsules is also the smaller volumetric capacity for holding ground coffee and the necessary greater sealing effect.

Therefore, there is need for plastic capsules having the same axial length of the original aluminium capsules allowing the injection needles to penetrate into the capsule but still avoiding the above problems of the hot injection needles melting the plastic.

From EP2210827 a conical capsule optionally made of plastic with a similar form as the original aluminium capsules is known. The capsule has on its narrower side a circular inlet opening covered from the inside of the capsule with a membrane. The membrane is attached to the capsule in a detachable sealing engagement. When water pressure builds up in a brewing chamber the detachable sealing membrane deflects and the water is injected into the capsule. The machines for these capsules however do not have hot injection needles or tear-open tips penetrating the inlet membrane and the capsule cannot be used in an expresso machine with hot injection needles or tear-open tips.

FR2617389 describes another type of capsules for producing e.g. cappuccino where after brewing the entire content of the capsule is removed by a tube-like emptying element into a cup. Thereby a membrane attached to the edge of an opening is pierced by the emptying element approximately the size of the opening. The emptying element however is not hot and the problem of softening or melting the plastic of the capsule does not occur.

SUMMARY OF THE INVENTION

One embodiment of the invention provides a capsule compatible with the well-known Nespresso machines, said capsule being made of plastic and having approximately the same size and axial length of the original aluminium capsules allowing the injection needles to penetrate into the capsule. The above problems of the hot injection needles melting the plastic should be avoided.

Thus, the capsule which under pressure in expresso machines is suitable for extraction of coffee and which may contain roasted and ground coffee, comprises a truncated cone-shaped capsule body of thermoformed plastic having a conical side wall, the wider end of the conical side wall defining an outlet side of the capsule and the narrower end of the conical side wall defining an inlet side of the capsule; an outwardly directed circumferential first flange on the wider end of the side wall providing a sealing area towards a brewing chamber of an expresso machine; and a circular inlet opening on the narrower end of the conical side wall. The capsule further comprises a destructible outlet sealing membrane being attached to the first flange and closing the outlet side of the capsule body; and a destructible inlet sealing membrane closing the inlet opening of the capsule body and being attached to the inside of the capsule body. The capsule body further comprises a circumferential centering ramp at the narrower end of the conical side wall, which translates into an inwardly directed circumferential second flange forming the circular inlet opening. The circumferential centering ramp is designed to align the inlet sealing membrane with the inlet opening before welding it to the second flange. The inlet sealing membrane has a diameter larger than the outer diameter of the second flange, such that the circular edge of the inlet sealing membrane is able to bend upwards along the centering ramp and at least partially covers the centering ramp when welding it to the second flange, wherein the upwards bend circular edge forms a heat protecting layer between a hot sealing tool and the centering ramp during welding the inlet membrane to the second flange.

Because in the existing expresso machines several injection needles or tear-open tips are arranged in a widely spaced arrangement the inlet opening of a capsule with a plastic capsule body must have a size as large as possible in order to avoid contact with the hot injection means of the machine. On the other hand the capsule body on its narrower side must still provide a large enough area for permanently attaching the sealing membrane in an accurate and efficiently manufacturing process manner. In order to fulfil both criteria the plastic capsule comprises the inwardly directed circumferential second flange, onto which the sealing membrane is welded, and a centering ramp for correctly positioning the sealing membrane during the manufacturing process.

At the same time the inlet sealing membrane has a diameter larger than the outer diameter of the second flange. The inlet sealing membrane placed inside the capsule body during the manufacturing process is typically attached to the flange by thermo-welding with a sealing tool e.g. in the form of a welding iron pressing the sealing membrane onto the flange. Thereby the inlet sealing membrane with its oversize compared to the outer diameter of the flange (or inner diameter of the centering ramp) is bend upwards along the centering ramp and at least partially covers the lower part of the centering ramp. This upward formed bend of the sealing membrane protects the centering ramp and the capsule body from the heat of the sealing to e.g. in form of a welding iron allowing the actual welding ring to be closer to the conical side wall. This in turn allows to reduce the size of the inwardly directed flange and thereby enlarge the size of the inlet opening to avoid contact of the plastic capsule with the hot injection means of the expresso machine.

With the present invention the diameter of the circular opening can be designed such that hot injection needles or tear-open tips of the expresso machine do not touch the plastic capsule body when penetrating into the capsule.

Further embodiments of the invention are also disclosed.

A good performance of the circumferential centering ramp for centering and bending the inlet sealing membrane has been found with a circumferential centering ramp having an off-axis angle to the longitudinal axis of the capsule of 20 to 50 degrees, preferably 35 to 40 degrees.

In some embodiments the second flange may be approximately perpendicular to the longitudinal axis of the conical side wall and may form a bottom portion of the capsule body. This allows the use of a flat welding iron having a welding area corresponding approximately to the area of the circumferential second flange.

In some embodiments the second flange may have a width in radial direction of 2 to 3 mm, preferably between 2.2 and 2.5 mm, such that the inlet sealing membrane may be permanently attached in a tight sealing manner.

In some embodiments the diameter of inlet sealing membrane may be 5 to 15%, preferably about 10%, larger than the outer diameter of the second flange, such that it partially covers the centering ramp when attached to the second flange. The outer diameter of the second flange also corresponds to the inner diameter of the centering ramp.

In some embodiments the second flange and the inlet sealing membrane may form a flat bottom portion of the capsule.

In some embodiments the capsule body may be thermoformed from a layered plastic sheet material comprising on both outer sides a layer of polypropylene and an inner barrier layer of EVOH.

In some embodiments the membrane may be a metallic membrane preferably of aluminium. The inlet membrane may be coated on the sealing side with polypropylene to improve welding onto the first or second flange, respectively.

In some embodiments the inlet membrane may be permanently attached to the second flange by thermo welding.

In some embodiments the inlet and/or outlet sealing membrane may be structured by embossing.

BRIEF EXPLANATION OF THE FIGURES

The invention is described in greater detail below with reference to embodiments that are illustrated in the figures. The figures show.

EMBODIMENTS OF THE INVENTION

Figure 1:
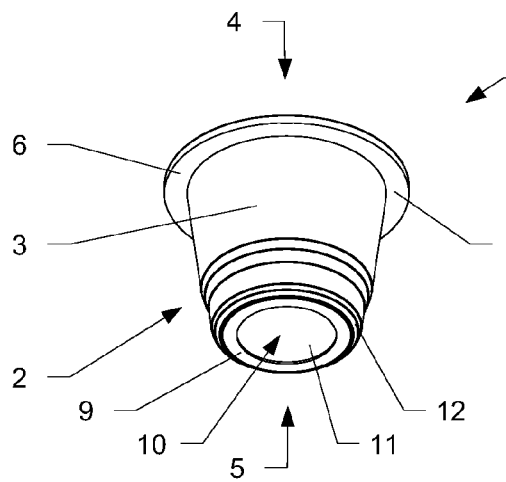
FIG. 1 a perspective view of the capsule showing the inlet side.
Figure 2:
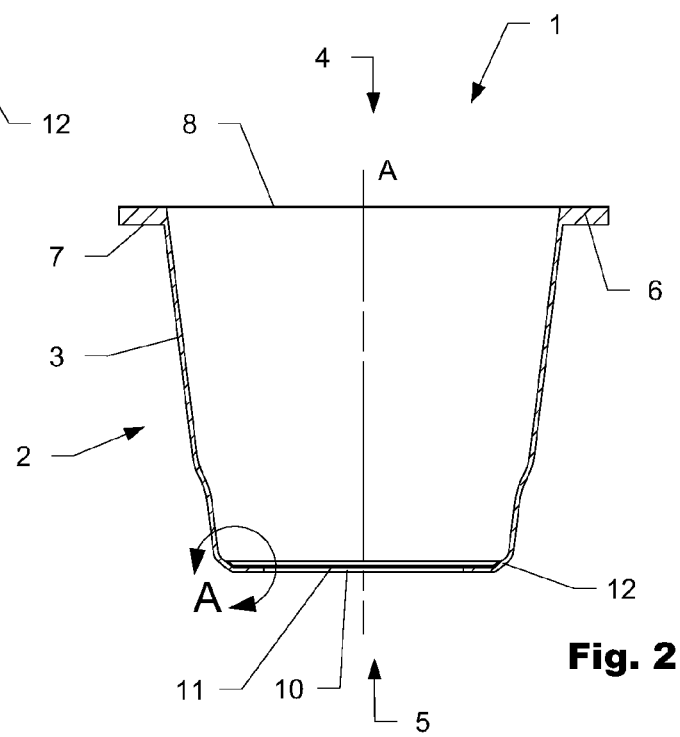
FIG. 2 a sectional view of the capsule of FIG. 1.

FIG. 1 and FIG. 2 show a perspective view and a sectional view of the capsule according to the invention. The capsule 1, which may be filled with roasted and ground coffee (not shown), has a truncated cone-shaped capsule body 2 made of thermoformed plastic. The capsule body 2 has a conical side wall 3 the wider end of which defines an outlet side 4 of the capsule 1 and the narrower side of which defines an inlet side 5 of the capsule 1. The inlet side 5 of the capsule 1 refers to the water entering side of the capsule in use, where hot injection means of a expresso machine penetrate into the capsule. The outlet side 4 of the capsule 1 refers to the side, where the brewed coffee leaves the capsule 1.

The capsule body 2 comprises on its wider end an outwardly directed (away from the longitudinal axis A of the capsule body) circumferential first flange 6 provided with a sealing and clamping area 7 to seal the capsule 1 against a brewing chamber of a expresso machine and hold the capsule in said brewing chamber in position while the coffee is brewed. A destructible outlet sealing membrane or film 8 of aluminium is welded from the outside onto the first flange 6.

The capsule body 2 is further provided with an inwardly directed (towards the longitudinal axis A of the capsule body) circumferential second flange 9 on the narrower inlet side defining an inlet opening 10. The second flange 9 is formed after the thermoforming process by cutting the opening 10 into the bottom of a preformed capsule body. A destructible inlet sealing membrane or film 10 of aluminium is welded from the inside onto the second flange 9 to sealingly close the inlet opening 10. The diameter of the inlet opening 10 is designed such that hot injection needles or piercing members of the expresso machine cannot touch the plastic capsule body 2 while penetrating into the capsule 1, but only pierce the aluminium sealing membrane 10.

The second flange 9 is approximately perpendicular to the longitudinal axis A of the conical side wall 3 forming a bottom portion of the capsule body 2. The width in radial direction of the second flange is 2 to 3 mm, preferably between 2.2 and 2.5 mm, most preferably approximately 2.4 mm, to allow enough contact area for welding the inlet sealing membrane 11 onto the capsule body 2.

Figure 3:
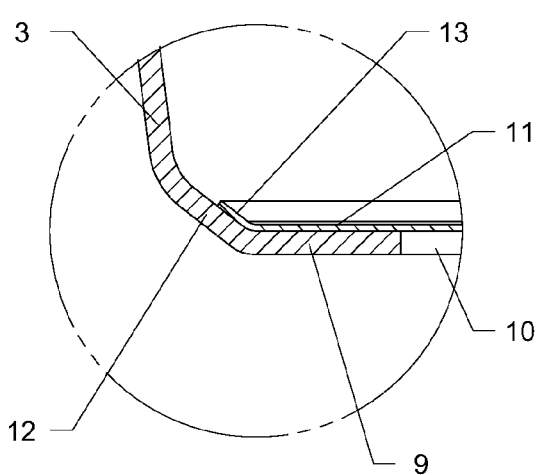
FIG. 3 a detailed view of the capsule of FIG. 1.
Figure 4:
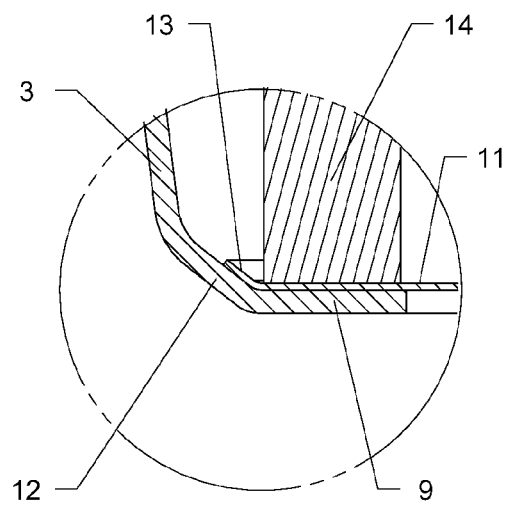
FIG. 4 a detailed view of the capsule during welding.

Between the second flange 9 and the conical side wall 3, the capsule body 2 further comprises a circumferential centering ramp 12 with an off-axis angle to the longitudinal axis A of 20 to 50 degrees, preferably about 35 to 40 degrees, as can be nicely seen in the detailed views of FIG. 3 and FIG. 4.

The centering ramp 12 fulfils two functions: firstly it supports the precise alignment of the inlet sealing membrane 11 with the second flange 9 and the inlet opening 10 when placed inside the capsule body 2 during the manufacturing process of the capsule 1; secondly it supports protection of the conical side wall 3 from the heat of the sealing tool e.g. in form of a welding iron 14 (see FIG. 4) during the thermo welding. Therefore, the circular inlet sealing membrane 10 has a diameter slightly larger as the outer diameter of the second flange 9 (or the corresponding inner diameter of the centering ramp 12), preferably larger by about 5 to 15%, more preferably by about 10%. The oversize together with the inclined centering ramp 13 leads to an upwards bend 14 of the circular edge of the inlet sealing membrane to form a heat protecting layer between a hot sealing tool 14 and the plastic capsule body 2 during welding (see FIG. 4).

Both the outlet and inlet sealing membrane (8, 11) are provided with a coating, preferably polypropylene, in order to effectively weld it onto the respective flange (6, 9). The sealing membranes (8, 11) of aluminium may further have an embossed structure to reduce unintentional tearing of the membrane.

REFERENCE SIGNS 1 capsule
2 capsule body
3 conical side wall
4 outlet side
5 inlet side
6 first flange
7 sealing area
8 outlet sealing membrane
9 second flange
10 inlet opening
11 inlet sealing membrane
12 centering ramp
13 bend in inlet sealing membrane
14 sealing tool/welding iron

The invention claimed is:

1. A capsule which under pressure in espresso machines is suitable for extraction of coffee, the capsule comprising:
  a truncated cone-shaped capsule body of thermoformed plastic having;
    a conical side wall, the wider end of the side wall defining an outlet side of the capsule and the narrower end of the side wall defining an inlet side of the capsule;
    an outwardly directed circumferential first flange on the wider end of the conical side wall providing a sealing area towards a brewing chamber of the espresso machine; and
    a circular inlet opening on the narrower end of the conical side wall; the capsule further comprising;
    a destructible outlet sealing membrane being attached to the first flange and closing the outlet side of the capsule body; and
    a destructible inlet sealing membrane closing the inlet opening of the capsule body and being attached to the inside of the capsule body;
  wherein the capsule body further comprises a circumferential centering ramp at the narrower end of the conical side wall, which translates into an inwardly directed circumferential second flange forming the circular inlet opening, the circumferential centering ramp designed to align the inlet sealing membrane with the inlet opening before welding it to the second flange; and
  wherein the inlet sealing membrane has a diameter larger than the outer diameter of the second flange, such that the circular edge of the inlet sealing membrane is able to bend upwards along the centering ramp and at least partially covers the centering ramp when welding it to the second flange, wherein the upwards bend circular edge forms a heat protecting layer between a hot sealing tool and the centering ramp during welding the inlet membrane to the second flange.

2. The capsule of claim 1, wherein the circumferential centering ramp has an off-axis angle to the longitudinal axis of the capsule of 20 to 50 degrees.

3. The capsule of claim 1, wherein the second flange is approximately perpendicular to the longitudinal axis of the conical side wall and forms a bottom portion of the capsule body.

4. The capsule of claim 1, wherein the second flange has a width in radial direction of 2 to 3 mm.

5. The capsule of claim 1, wherein the diameter of inlet sealing membrane is 5 to 15% larger than the outer diameter of the second flange, such that it partially covers partially covers the centering ramp when attached to the second flange.

6. The capsule of claim 1, wherein the second flange and the inlet sealing membrane form a flat bottom portion of the capsule.

7. The capsule of claim 1, wherein the capsule body is thermoformed from a layered plastic sheet material comprising on both outer sides a layer of polypropylene and an inner barrier layer of EVOH.

8. The capsule of claim 1, wherein the sealing membrane is a metallic membrane.

9. The capsule of claim 8, wherein the outlet and inlet sealing membrane are coated on the sealing side with polypropylene to improve welding onto the first or second flange, respectively.

10. The capsule of claim 1, wherein the inlet membrane is permanently attached to the second flange by welding.

11. The capsule of claim 1, wherein the inlet and/or outlet sealing membrane are structured by embossing.

12. The capsule of claim 1, wherein the circumferential centering ramp has an off-axis angle to the longitudinal axis of the capsule of 35 to 40 degrees.

13. The capsule of claim 1, wherein the second flange has a width in radial direction of between 2.2 and 2.5 mm.

14. The capsule of claim 1, wherein the diameter of inlet sealing membrane is about 10% larger than the outer diameter of the second flange, such that it partially covers partially covers the centering ramp when attached to the second flange.

15. The capsule of claim 1, wherein the sealing membrane is an aluminium membrane.

16. The capsule of claim 15, wherein the outlet and inlet sealing membrane are coated on the sealing side with polypropylene to improve welding onto the first or second flange, respectively.

* * * * *